3,104,673
PRESSURE-RESPONSIVE FLUID FLOW
CONTROL VALVE
Jerry Kirsch, 3946 Bishop Road, Detroit 24, Mich.
Filed Feb. 20, 1961, Ser. No. 90,491
6 Claims. (Cl. 137—71)

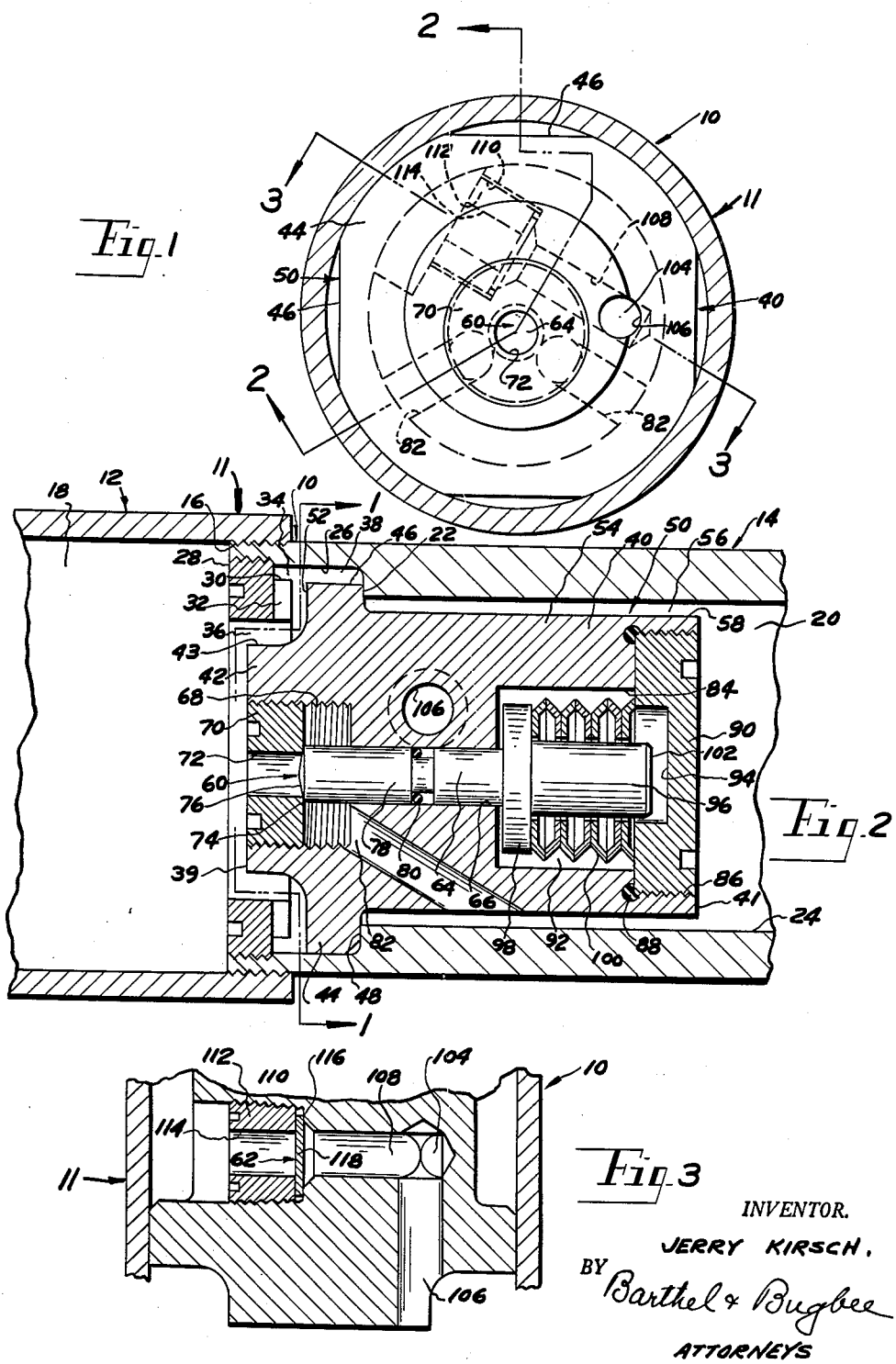

This invention relates to fluid valves and, in particular, to fluid flow control valves.

One object of this invention is to provide a fluid flow control valve having a spring-pressed valve plunger movable out of engagement with its seat in response to the attainment of a predetermined pressure on the normally higher pressure upstream or inlet side of the valve.

Another object is to provide a fluid flow control valve of the foregoing character wherein the action of the spring urging the valve plunger in its closing direction is so constructed and arranged as to be independent of any pressure upon the downstream side of the valve, in that the spring is mounted in a closed chamber from which communication with the normally lower pressure downstream or outlet side of the valve is blocked.

Another object is to provide a fluid flow control valve of the foregoing character in which the spring for urging the valve plunger toward its closing direction is composed of a plurality of convexo-concave spring discs, thereby requiring a much smaller space for accommodating the spring and adapting it to the limited space available while providing adequate spring action over a sufficiently long stroke of the plunger without unacceptable variation of spring force.

Another object is to provide a fluid flow control valve of the foregoing character wherein safety relief means is provided for escape and bypassing of fluid from the upstream to the downstream side of the valve in the event that seepage of fluid along the valve plunger bore into the spring chamber effected a locking action upon the spring in such a manner as to prevent reciprocation of the valve plunger.

Another object is to provide a fluid flow control valve of the foregoing character which is equally adaptable for use with liquid or gaseous fluid, that is, for relatively incompressible and relatively compressible fluids, or mixtures of such fluids.

Other objects and advantages of the invention will become apparent during the course of the following description of the accompanying drawing, wherein:

FIGURE 1 is a cross-section through a fluid flow control valve, with the valve body seen in front end elevation, looking in the direction of the line 1—1 in FIGURE 2;

FIGURE 2 is a longitudinal section through the fluid flow control valve of FIGURE 1, taken along the zigzag line and plane 2—2 in FIGURE 1; and FIGURE 3 is a fragmentary longitudinal section taken along the line 3—3 in FIGURE 1, showing the emergency safety blowout device for fluid release in the event of the valve plunger locking from fluid seepage into the valve plunger spring chamber.

Referring to the drawings in detail, FIGURES 1 to 3 inclusive show a fluid flow control valve, generally designated 10, according to one form of the invention as including a casing structure 11 composed of a pair of mounting casings or conduits 12 and 14 threaded or otherwise joined together at a junction 16 (FIGURE 2) to provide an upstream or fluid inlet chamber 18 of normally higher pressure and a downstream or fluid outlet chamber 20 of normally lower pressure separated from one another at an annular radial shoulder or casing check valve seat 22 formed between the bore 24 and counterbore 26 of the casing 14. The counterbore 26 is internally threaded and closed at its outer end by a threaded stop ring 28 having inwardly projecting bosses 30 spaced circumferentially from one another to provide radial fluid passageways 32 therebetween (FIGURE 2). The stop bosses or lugs 30 terminate short of the counterbore 26 to provide an annular longitudinal fluid passageway 34 outwardly thereof communicating with the radial fluid passageways 32.

Continuations 36 and 38 of the fluid passageways 32 and 34 occur at 36 radially inward from the stop ring 28 and at 38 radially outward from a movable valve body 40 which is reciprocable longitudinally within the bore 24 of the downstream conduit 14. In particular, the valve body 40 has front and rear end surfaces 39 and 41 and a reduced diameter front end or nose portion 42, the external surface 43 of which is spaced inwardly from the stop ring 28 to form the longitudinal passageway 36 therebetween. The valve body 40, rearwardly of the front end or nose portion 42, also has a radial flange 44 having chordal flat spot 46 thereon (FIGURE 1) arranged at suitably spaced circumferential intervals, such as the ninety degree intervals shown in FIGURE 1. The flange 44 constitutes a check valve head having a radial inner or rearward shoulder 48 which is engageable with the check valve seat 22 to block communication or flow of fluid from the upstream chamber 18 to the downstream chamber 20 where the fluid pressure in the upstream chamber 18 exceeds the fluid pressure in the downstream chamber 20. The valve body 40 is movable bodily to and fro so as to constitute a reciprocable valve unit or assembly, generally designated 50, the check valve head or flange 44 of which moves back and forth between sealing engagement of its rearward surface 48 with the radial shoulder or seat 22 and fluid-flow-permitting engagement of its forward surface 52 with the spaced stop bosses or lugs 30. The valve body 40 rearwardly of the flange 44 has a reduced diameter rearward portion 54 (FIGURE 1) forming an annular fluid passageway 56 between its outer surface 58 and the bore 24 of the downstream conduit 14.

The reciprocable valve unit 50, in addition to the valve body 40, includes an auxiliary pressure-responsive valve, generally designed 60, and an emergency over-pressure blowout device, generally designated 62 (FIGURE 3), both the valve 60 and blowout device 62 being housed within and movable unitarily with the valve body 40. The auxiliary valve 60 in turn includes a reciprocable valve plunger 64 mounted in a longitudinal valve bore 66 in the valve body 40. The valve bore 66 at its forward end opens into an internally-threaded forward counterbore 68 into which is threaded a valve seat plug 70 having a central bore or passageway 72 therethrough terminating at its inner end in an auxiliary valve seat 74.

The auxiliary valve seat 74 is engaged by the shallow conical end 76 of the forward portion 78 of the valve plunger 64. The forward portion 78 is of reduced diameter snugly but slidably fitting the bore 66 in the valve body 40 and is annularly grooved to receive an O-ring 80 for inhibiting leakage between the bore 66 and the valve stem 78. An oblique passageway 82 leads from the inner end of the counterbore 68 to the outer surface 58 of the valve body 40, thereby connecting the counterbore 68 to the annular fluid passageway 56 between the valve body outer surface 58 and the bore 24 of the downstream conduit 14.

The inner or rearward end of the valve plunger bore 66 opens into an intermediate counterbore 84 (FIGURE 2) which in turn opens into an internally-threaded rearward counterbore 86 annularly grooved at its inner end to receive a resilient sealing ring 88 which, like the O-ring 80, is preferably made from elastic deformable material, such as natural or synthetic rubber or resilient synthetic plastic. The rearward counterbore 86 is closed and tightly sealed by a screw plug 90 threaded into the rearward counterbore 86 against the sealing ring 88 so as to prevent any leakage of fluid between the downstream chamber 20 within the mounting casing 14 and the spring chamber 92 formed by the intermediate counterbore 84 and the screw plug 90, which contains a central cup-shaped recess 94.

The auxiliary pressure-responsive valve plunger 64 terminates rearwardly within the spring chamber 92 in a rearward end portion 96 of slightly larger diameter than the forward plunger portion 78 and separated from it by a spring abutment or stop flange 98. Mounted in opposed pairs on the rearward end portion 96 of the auxiliary valve plunger 64 are multiple convexo-concave spring washers 100, the foremost of which engages the abutment flange 98 and the rearmost of which engages the screw plug 90 as a rearward abutment. These spring washers 100 have the advantage of providing ample spring force within a very small space and yet giving a very even spring force over the desired length of stroke of the valve plunger 64. The force urging the auxiliary valve plunger end 76 into engagement with its seat 74 may also be conveniently varied to vary the pressure level at which fluid flow control is regulated by adding or subtracting washers 100 from the set thereof mounted on the plunger portion 96. The length of stroke of the valve plunger 64 is determined by the distance between the end 102 of the rearward portion 96 of the valve plunger 64 and the bottom of the recess 94 when the end 76 of the valve plunger 64 is in engagement with its seat 74.

The emergency over-pressure blowout device 62 is provided in order to effect release of fluid, in the event that the flow control valve 10 is being used with a relatively incompressible fluid, such as oil, and the oil seeps past the O-ring 80 into the spring chamber 92 in sufficient quantities to fill the spring chamber 92 and lock the auxiliary valve plunger 94 in its forward position shown in FIGURE 2. For this purpose, the blowout device 62 includes an L-shaped safety fluid bypass passageway 104 (FIGURE 3) having a transverse portion 106 leading from the upstream fluid chamber 18 through the nose portion 42 of the valve body 40 to a longitudinal portion 108 terminating in a threaded counterbore 110 which opens into the annular space 56 between the valve body 40 and the conduit 14. Threaded into the counterbore 110 is a screw plug 112 (FIGURE 3) with a central passageway 114 therethrough. Seated against the annular shoulder 116 between the longitudinal passageway portion 108 and its counterbore 110 is a thin rupturable safety blowout disc 118 held in position by the screw plug 112.

In the operation of the fluid flow control valve 10, let it be assumed that the upstream chamber 18 within the conduit 12 has been supplied with pressure fluid, such as liquid or gas or a mixture thereof. Under these circumstances, the pressure of the fluid in the upstream chamber 18 acting against the front end surface 39 of the valve body 40 (including the front surface 52 of the flange 44) urges the rear surface 48 of the flange 44 into sealing engagement with the annular shoulder or seat 22 within the conduit 14 and prevents flow of fluid through the passageways 36, 32, 34, 38. Let it now be assumed that the pressure within the upstream chamber 18 rises to an extent sufficient, when acting upon the front end surface 76 of the valve plunger 64, to overcome the thrust of the spring washers 100 and force the spring-pressed plunger 64 off its seat 74. When this occurs, fluid escapes from the upstream chamber 18 through the passageways 72 and 82 and the annular space 56 into the downstream chamber 20, relieving the pressure within the upstream chamber 18 and causing it to fall until the force of the spring washers 100 is sufficient to urge the front end 76 of the valve plunger 64 again into engagement with its seat 74 and cut off further flow of fluid. This action occurs automatically in the above manner to maintain a constant pressure of fluid in the upstream chamber 18.

If the pressure relationship set forth above is reversed, so that the pressure in the downstream chamber 20 temporarily exceeds that in the upstream chamber 18, the pressure acting against the rearward end surface 41 of the valve body 40 moves the latter to the left until the forward surface 52 of the flange 44 engages the stop lugs 28, whereupon fluid flows freely from the downstream chamber 20 through the annular space 56 between the valve body 40 and the conduit 14 past the shoulder 22 and through the passageways 38, 34, 32 and 36 into the upstream chamber 18. In this manner, the valve unit 50 as a whole acts as a unidirectional valve or check valve in one direction and as a pressure-responsive control valve in the opposite direction.

Let it be assumed that a hydraulic fluid, such as oil, is being controlled by the valve unit 50 and that the oil gradually seeps past the O-ring 80 into the spring chamber 92 and fills it, thereby locking the auxiliary valve plunger 64 against reciprocation. The accumulation of a dangerous pressure within the upstream chamber 18 is now prevented by the action of the emergency blowout device 62. The pressure of the hydraulic fluid acting against the front surface of the blowout or rupturable disc 118 exceeds the elastic limits of the latter and breaks it, permitting fluid to flow from the upstream chamber 18 through the L-shaped passageway 104 and the screw plug passageway 114 (FIGURE 3) into the annular space 56 and thence into the downstream chamber 20 providing a bypass for the fluid flow from the upstream chamber 18 to the downstream chamber 20 and preventing the building up of an excessive pressure which the auxiliary flow control valve 60 is incapable of relieving.

What I claim is:

1. A pressure-responsive hydraulic pressure fluid flow control valve, comprising a casing structure, a valve body mounted in said casing structure and separating said casing structure into an upstream fluid inlet chamber of normally higher fluid pressure and a downstream fluid outlet chamber of normally lower fluid pressure, said valve body having a fluid passageway extending therethrough from said inlet chamber to said outlet chamber and containing a valve seat, said valve body having a valve bore communicating with said fluid passageway and a spring chamber communicating with said valve bore, means completely sealing off said spring chamber from communication with said fluid outlet chamber, a valve plunger mounted in said valve bore for motion into and out of engagement with said valve seat and terminating within said spring chamber, said valve plunger having a piston area thereon communicating with said inlet chamber through said passageway, an annular hydraulic pressure-fluid-tight sealing member encircling said valve plunger in tight sealing engagement with said valve plunger and the wall of said valve bore, and spring means in said spring chamber engaging and resiliently urging said valve plunger into yielding pressure-responsive engagement with said valve seat.

2. A pressure-responsive hydraulic pressure fluid flow control valve, according to claim 1, wherein said spring chamber has a mouth opening into said outlet chamber, wherein said means completely sealing off said spring chamber comprises a closure member disposed in tightly-sealing engagement with said mouth and an annular hydraulic pressure-fluid-tight sealing element disposed between the wall of said mouth and said closure member in tight sealing engagement therewith.

3. A pressure-responsive hydraulic pressure fluid flow control valve, according to claim 1, wherein said casing structure has a valve check seat portion therein at the boundary between said inlet and outlet chambers, wherein said valve body is movably mounted in said casing structure into and out of engagement with said casing valve seat portion wherein said casing valve seat portion includes an annular check valve seat shoulder within said casing structure and wherein said valve body has a peripheral flange constituting a check valve head engageable with said check valve seat shoulder.

4. A pressure-responsive hydraulic pressure fluid flow control valve, according to claim 3, wherein said peripheral flange constituting said check valve head has cutaway portions therein providing fluid flow channels covered by said shoulder during engagement of said flange with said shoulder and uncovered upon disengagement thereof to effect fluid flow through said cutway portions upon disengagement of said flange from said shoulder.

5. A pressure-responsive hydraulic pressure fluid flow control valve, comprising a casing structure, a valve body mounted in said casing structure and separating said casing structure into an upstream fluid inlet chamber of normally higher fluid pressure and a downstream fluid outlet chamber of normally lower fluid pressure, said valve body having a fluid passageway extending therethrough from said inlet chamber to said outlet chamber and containing a valve seat, said valve body having a valve bore communicating with said fluid passageway and a spring chamber communicating with said valve bore, means completely sealing off said spring chamber from communication with said fluid outlet chamber, a valve plunger mounted in said valve bore for motion into and out of engagement with said valve seat and having a piston area thereon communicating with said inlet chamber through said passageway, an annular hydraulic pressure-fluid-tight sealing member encircling said valve plunger in tight sealing engagement with said valve plunger and the wall of said valve bore, spring means in said spring chamber engaging and resiliently urging said valve plunger into yielding pressure-responsive engagement with said valve seat, said valve body having a safety fluid bypass passageway extending therethrough from said inlet chamber to said outlet chamber independently of said fluid passageway and spring chamber, and an overpressure-responsive rupturable blowout member disposed in said bypass passageway.

6. A pressure-responsive hydraulic pressure fluid flow control valve, according to claim 5, wherein said blowout member comprises a relatively thin frangible disc having a peripheral portion secured to said valve body and having a central portion exposed to pressure of fluid within said bypass passageway.

References Cited in the file of this patent

UNITED STATES PATENTS

| | | |
|---|---|---|
| 393,856 | Reynolds | Dec. 4, 1888 |
| 633,706 | Swartz | Sept. 26, 1889 |
| 1,573,520 | McNab | Feb. 16, 1926 |
| 1,630,666 | McEvoy | May 31, 1927 |
| 2,710,162 | Snoddy | June 7, 1955 |
| 2,731,981 | Glasser | Jan. 24, 1956 |
| 2,920,638 | Heckethorn | Jan. 12, 1960 |

FOREIGN PATENTS

| | | |
|---|---|---|
| 588,004 | Great Britain | May 12, 1947 |
| 588,544 | Germany | May 28, 1933 |